Patented June 2, 1931

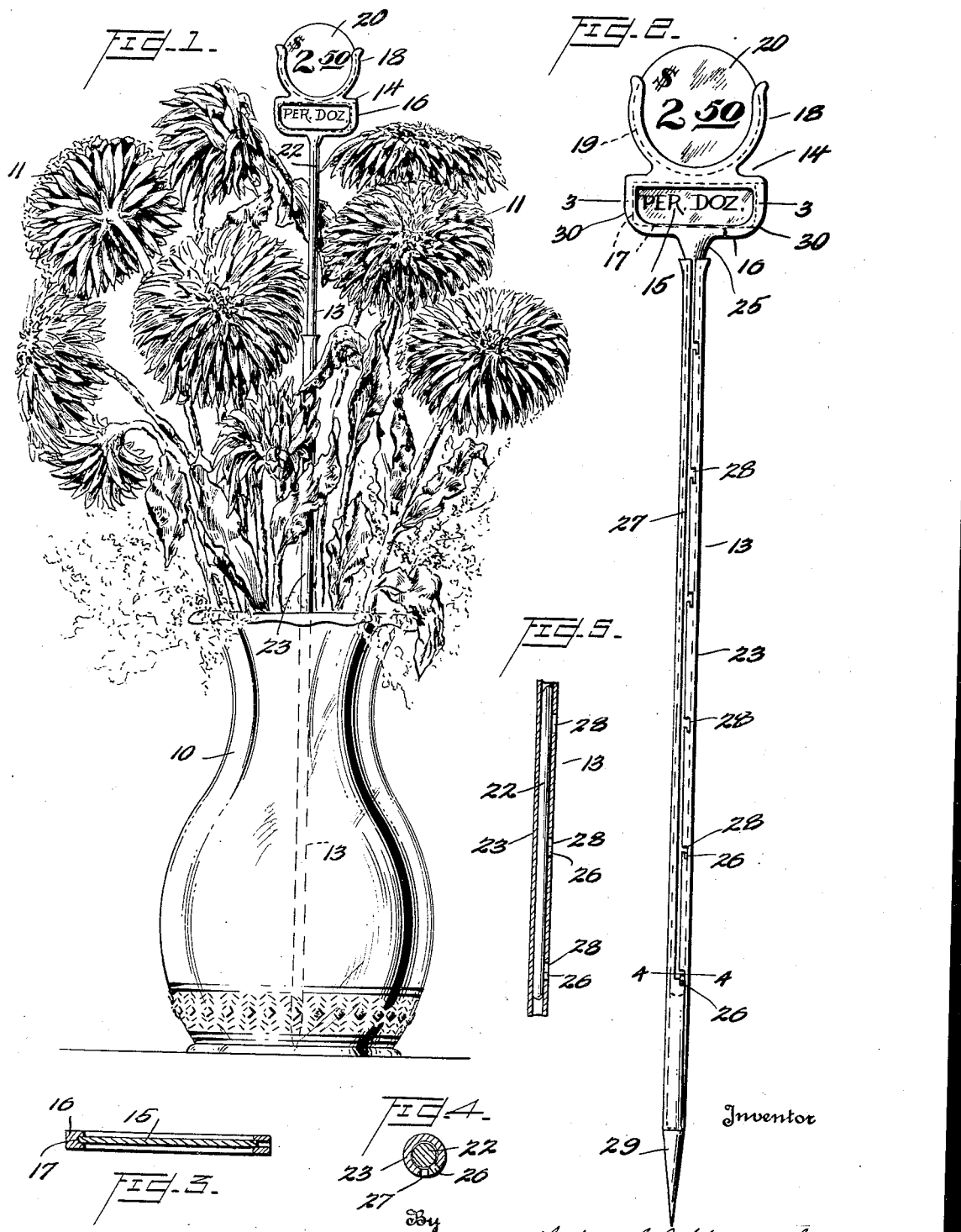

1,808,292

UNITED STATES PATENT OFFICE

DANIEL S. COPPERSMITH, OF BROOKLYN, NEW YORK

MARKER FOR PLANTS OR FLOWERS

Application filed November 26, 1929. Serial No. 409,972.

This invention relates to markers for plants or flowers and has for its object the provision of a device of this character which is simple to construct, pleasing in appearance, and durable.

Florists frequently find it convenient to display plants and flowers in sprays or bunches in suitable containers and to indicate the cost of the flowers in terms of a given quantity. It will be appreciated that where large assortments of plants and flowers are displayed in this manner, the conventional method of attaching price tags by means of strings or wires secured to the flowers involves a considerable waste of time and frequently results in damage to the flowers. This method is also open to the serious objection that the appearance of the flowers is thereby impaired rather than enhanced and the value of the display for the purpose of sale is correspondingly decreased.

It is therefore a feature of the present invention to provide a marker for flowers which may be easily positioned and removed and which will in no way injure the flowers or detract from the beauty of the display.

A more specific object of the invention is the provision of a marker comprising a supporting stem which may be thrust into a cluster of flowers or plants, and a legend bearing device carried by the stem and projecting above the flowers, the stem being adjustable so that the legend indicating the price or other data may be readily positioned at such a height as will be most favorable for observing the same without projecting to any material extent above the flowers.

A further object of the invention is the provision of a support for exchangeable legends designating the price and the corresponding quantity of flowers. Further objects and features of the invention will be apparent from the following description taken in connection with the accompanying drawings in which Figure 1 is an elevational view showing a marker constructed in accordance with the principles of the present invention as applied to a vase of flowers;

Figure 2 is a further elevational view showing the marker;

Figure 3 is a section on the line 3—3 of Fig. 2;

Figure 4 is a section on the line 4—4 of Fig. 2; and

Figure 5 is a fragmentary sectional view of the supporting stem.

While the invention is applicable to the marking of potted plants and loosely bunched flowers, the marker has been shown in Figure 1 for the purpose of illustration, in connection with a flower vase 10, the flowers 11 being loosely inserted therein. The stem of the marker, indicated generally at 13, is thrust downwardly into the bunch of flowers and is supported thereby. It will be understood that in the case of a potted plant the stem may be inserted in the soil to a depth sufficient to properly support the same.

A legend bearing device 14 is preferably mounted on the upper end of the stem and may assume various forms. In the preferred embodiment of the invention, this device consists of a substantially rectangular frame 16 provided with grooves 17 on three sides thereof and being slotted on the fourth side to receive a card or tab 15 in the usual manner. A forked portion 18, disposed above the rectangular frame and preferably formed integrally therewith, is similarly grooved as indicated at 19 to receive a second card or tab 20. It will be understood that interchangeable cards or tabs will be provided for insertion in the portions 16 and 18 of the device, the former preferably representing the price of the flowers and the latter designating the quantity corresponding to the indicated price.

As shown in Figure 2 of the drawings, the stem 13 comprises an elongated rod like member consisting primarily of two parts, an inner member 22 and an outer tubular member 23. The inner member 22 is preferably formed integrally with the legend bearing device 14 and has a free sliding fit within the tubular member 23, so that by sliding the inner member 22 into and out of the tubular member 23 the element 13 which comprises these members may be extended as desired. The member 22 is preferably enlarged somewhat as shown at 25 so that when the members 22 and 23 are telescoped the enlarged portion 25 will bind within the walls of the member 23 to frictionally retain these members in collapsed condition.

It is preferable to provide some means for securing the members 22 and 23 in any position of relative adjustment and one such arrangement is illustrated in the accompanying drawings in which a slot 27 is provided in the wall of the member 23 and one or more projections 26 are formed on the member 22, these projections extending freely into the slot 27. Bayonet slots 28, communicating with the slot 27 at spaced intervals, are also provided in the wall of the member 23. It will now be apparent that the member 22 may be inserted or withdrawn to any desired extent to effect an adjustment of the length of the stem 13, and may be retained in various positions by rotating the same to place the projections 26 in selected bayonet slots 28. The tubular member 23 is preferably pointed as shown at 29 to facilitate the insertion thereof in a bunch of flowers or into soil.

The use of the marker will now be apparent from the above description. Tabs indicating the price and quantity of the article to be marked are inserted in the marker, and the elongated stem 13 may be extended sufficiently to support the tabs above the flowers after the stem is positioned therein. It will be observed that the lower corners 30 of the rectangular frame 16 are rounded to prevent injury to such flowers as are withdrawn after the marker is inserted. The tabs are preferably provided with characters on both sides so that the price may be readily observed, thereby enabling the prospective purchaser to readily ascertain the price. The conspicuous marking of flowers or plants in this manner is found to stimulate the sale of the flowers without detracting from the appearance of the display.

The marker may be constructed of various materials, but is preferably formed of aluminum or other rust resisting metal and is either cast or stamped. The material and the manner of forming the same should preferably be so selected that the forked card receiving portion of the marker will be slightly resilient to yieldably retain the inserted card against accidental displacement.

The cards or tabs may be formed of a hard non-metallic material resistant to the moisture usually present in a florist's shop and having the legend impressed therein.

It will be understood that the invention is not limited to the exact details and shown herein for the purpose of illustration but that such changes and modifications are contemplated as fall within the spirit and scope of the appended claims.

Having thus described the invention, what is claimed as new and desired to be secured by Letters Patent is:

1. A marker for use with plants or flowers comprising an elongated tubular member adapted to be inserted into the article to be marked, an indicia displaying means, and a member connected to said means and adjustable within said tubular member for supporting said means at a convenient point above the article, said second named member being enlarged at a point adjacent said means to bind within said tubular member whereby said members may be frictionally retained in collapsed relation.

2. A marker for use with bunched flowers comprising an elongated member adapted to project downwardly into said flowers and an indicia supporting device carried by said member and extending above said flowers, said device comprising a substantially rectangular frame slotted to receive tabs indicating the quantity, a forked frame integral with said rectangular frame and projecting above the latter and adapted to receive tabs indicating the price corresponding to the indicated quantity.

3. A marker for use with bunched flowers comprising an elongated member adapted to project downwardly into said flowers and an indicia supporting device carried by said member and extending above said flowers, said device comprising a substantially rectangular frame slotted to receive tabs indicating the quantity, a forked frame integral with said rectangular frame and projecting above the latter and adapted to receive tabs indicating the price corresponding to the indicated quantity, the lower corners of said rectangular frame being appreciably rounded to prevent injury to the flowers on withdrawal thereof while the marker is in position therein.

4. A marker for use with plants or flowers comprising an elongated tubular member of relatively small diameter, a legend displaying means, a second elongated member adjustably received within said tubular member for substantially its entire length, and means for retaining said second elongated member in various positions of adjustment with respect to said tubular member, said legend displaying means being secured to one of said members whereby said marker may be thrust into the article to be marked and said members relatively adjusted to support said legend displaying means at a convenient point above the article.

5. A marker as defined in claim 4 in which the legend displaying means is secured to the second elongated member and the tubular member is pointed at its end remote from the legend displaying means to facilitate thrusting the marker into flowers or into soil in which plants or flowers are growing.

6. In apparatus for displaying plants or flowers, the combination with a container having a substantially closed bottom and adapted to receive loose or growing plants or flowers, of a marker for exhibiting legends descriptive of such plants or flowers, said marker comprising a legend bearing device and an elongated member received within said container for supporting said legend bearing device, said marker being extensible by more than half the original length thereof, and means for retaining said member in extended condition, whereby the extent to which said legend bearing device projects above said container may be substantially varied to position the legend directly above the plants or flowers in the container.

In testimony whereof I hereunto affix my signature.

DANIEL S. COPPERSMITH.